US012637223B2

(12) United States Patent
Berjot et al.

(10) Patent No.: US 12,637,223 B2
(45) Date of Patent: May 26, 2026

(54) AIRCRAFT ENGINE ATTACHMENT SYSTEM COMPRISING A TWO-POINT SHACKLE EQUIPPED WITH AT LEAST ONE STOP, AIRCRAFT COMPRISING AT LEAST ONE SUCH ENGINE ATTACHMENT SYSTEM

(71) Applicant: Airbus Operations SAS, Toulouse (FR)

(72) Inventors: Michael Berjot, Toulouse (FR); Louise Revy, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 0 days.

(21) Appl. No.: 19/090,986

(22) Filed: Mar. 26, 2025

(65) Prior Publication Data

US 2025/0304271 A1 Oct. 2, 2025

(30) Foreign Application Priority Data

Mar. 28, 2024 (FR) .................................. FR2403136

(51) Int. Cl.
*B64D 27/40* (2024.01)

(52) U.S. Cl.
CPC .................................. *B64D 27/402* (2024.01)

(58) Field of Classification Search
CPC .......................................................... F02C 7/20
See application file for complete search history.

(56) References Cited

U.S. PATENT DOCUMENTS

| | | | | | |
|---|---|---|---|---|---|
| 4,065,077 | A * | 12/1977 | Brooks | B64D 27/404 60/797 |
| 5,860,623 | A | 1/1999 | Dunstan et al. | |
| 6,330,995 | B1 | 12/2001 | Mangeiga et al. | |
| 10,647,441 | B2 * | 5/2020 | Combes | B64D 27/402 |
| 11,345,480 | B2 * | 5/2022 | Mertes | F02C 7/20 |
| 11,975,857 | B2 * | 5/2024 | Berjot | B64D 27/402 |
| 2003/0068192 | A1 * | 4/2003 | Schilling | F02C 7/32 403/23 |
| 2006/0219841 | A1 | 10/2006 | Dron et al. | |
| 2008/0230675 | A1 * | 9/2008 | Audart-Noel | B64D 27/404 244/54 |
| 2017/0050738 | A1 * | 2/2017 | Butcher | B64D 27/12 |

(Continued)

OTHER PUBLICATIONS

French Search Report for corresponding French Patent Application No. 2403136 dated Sep. 18, 2024.

*Primary Examiner* — Joshua J Michener
*Assistant Examiner* — Cindi M Curry
(74) *Attorney, Agent, or Firm* — Greer, Burns & Crain, Ltd.

(57) ABSTRACT

An engine attachment system connecting an aircraft motive-power unit and a primary structure of an aircraft pylon, and comprising: at least one clevis block secured to the primary structure or to the motive-power unit, at least one two-point shackle which comprises a body, an extension forming just one single component with the body, at least a first stop connected to the extension and facing a first flange of the clevis block and/or at least a second stop connected to the extension and facing a second flange of the clevis block, a connection pin housed in an orifice passing through the body, and a ball-joint connection positioned in the orifice and interposed between the body and the connection pin.

12 Claims, 4 Drawing Sheets

(56) References Cited

U.S. PATENT DOCUMENTS

| | | | | |
|---|---|---|---|---|
| 2018/0127105 | A1 | 5/2018 | Orteu | |
| 2019/0161198 | A1* | 5/2019 | Combes | F16C 11/0614 |
| 2020/0369395 | A1* | 11/2020 | Deforet | B64D 27/404 |
| 2022/0355946 | A1* | 11/2022 | Berjot | B64D 27/404 |

* cited by examiner

AIRCRAFT ENGINE ATTACHMENT SYSTEM COMPRISING A TWO-POINT SHACKLE EQUIPPED WITH AT LEAST ONE STOP, AIRCRAFT COMPRISING AT LEAST ONE SUCH ENGINE ATTACHMENT SYSTEM

CROSS-REFERENCES TO RELATED APPLICATIONS

This application claims the benefit of French Patent Application Number FR2403136 filed on Mar. 28, 2024, the entire disclosure of which is incorporated herein by way of reference.

FIELD OF THE INVENTION

The present application relates to an aircraft engine attachment system comprising a two-point shackle equipped with at least one stop and to an aircraft comprising at least one such engine attachment system.

BACKGROUND OF THE INVENTION

According to an embodiment visible in FIGS. 1 and 2, an aircraft 10 comprises a plurality of propulsion assemblies 12 positioned beneath each of the wings 14 of the aircraft. Each propulsion assembly 12 comprises a motive-power unit 16, a nacelle (not shown in FIG. 2) positioned around the motive-power unit 16, and a pylon 18 connecting the motive-power unit 16 and the wing 14. The pylon 18 comprises a primary structure 20 that is connected to the motive-power unit 16 by an engine attachment system 22 and to the wing 14 by a wing attachment system 24.

For the present invention, a longitudinal direction X is substantially parallel (+/−10%) to the axis of rotation A16 of the motive-power unit 16. A horizontal transverse direction Y is a horizontal direction perpendicular to the axis of rotation A16. A vertical direction is denoted Z in the various figures.

The engine attachment system 22 comprises a front engine attachment system 26, a rear engine attachment system 28 and a pair of thrust rods 30 that react the thrust forces.

According to an embodiment visible in FIG. 3, for the rear engine attachment system 28, the primary structure 20 comprises a sole 32 positioned approximately (+/−10%) in a horizontal plane.

In addition, the rear engine attachment system 28 comprises a transverse beam 34 that has a bearing face F34 pressed against the sole 32, the transverse beam 34 being connected to the primary structure 20 by connection elements 36.

The rear engine attachment system 28 comprises:

- an L-shaped three-point first shackle 38, which has a first end 38.1, a second end 38.2 and an intermediate zone 38.3,
- a first engine connection pin 40 connecting the first end 38.1 of the first shackle 38 and the motive-power unit 16,
- a first beam connection pin 42 connecting the second end 38.2 of the first shackle 38 and the transverse beam 34,
- a second beam connection pin 44 connecting the intermediate zone 38.3 of the first shackle 38 and the transverse beam 34;
- a two-point second shackle 46, which has first and second ends 46.1, 46.2,

- a second engine connection pin 48 connecting the first end 46.1 of the second shackle 46 and the motive-power unit 16,
- a third beam connection pin 50 connecting the second end 46.2 of the second shackle 46 and the transverse beam 34;
- an emergency connection pin 52, directly connecting the transverse beam 34 and the motive-power unit 16 in the event of a failure, positioned at the vertical median plane PMV.

The two-point second shackle 46 comprises a first orifice 54 configured to house the second engine connection pin 48, a second orifice 56 configured to house the third beam connection pin 50, first and second faces F46, F46' that are substantially mutually parallel and perpendicular to the axes of the first and second orifices 54, 56 and an edge-face 58 connecting the first and second faces F46, F46' and substantially perpendicular to the latter faces. The two-point second shackle 46 comprises a first intersection edge 60.1 connecting the first face F46 and the edge-face 58 and a second intersection edge 60.2 connecting the second face F46' and the edge-face 58. These first and second intersection edges 60.1, 60.2 may be chamfered.

At the second shackle 46, the rear engine attachment system 28 comprises a first ball-joint connection 54.1 interposed between the first orifice 54 and the second engine connection pin 48 and a second ball-joint connection 56.1 interposed between the second orifice 56 and the third beam connection pin 50.

For each engine connection pin 40, 48, the motive-power unit 16 comprises an engine clevis block 62 having first and second flanges 62.1, 62.2 that support the corresponding engine connection pin 40, 48 and are spaced away from one another in such a way as to house the first ball-joint connection 54.1.

For each beam connection pin 42, 44, 50, the transverse beam 34 comprises a beam clevis block 64 having first and second flanges 64.1, 64.2 that support the corresponding beam connection pin 42, 44, 50, and are spaced away from one another in such a way as to house the second ball-joint 56.1.

During operation, each of the first and second ball-joint connections 54.1, 56.1 allows a first rotation resulting from the various loadings scenarios and from the phenomena of differences in expansion between the motive-power unit 16 and the primary structure 20. As illustrated in FIG. 5, the first and second ball-joint connections 54.1, 56.1 allow the second shackle 46 to pivot about an axis of pivoting AP that passes through the centers C54.1, C56.1 of the balls of the first and second ball-joint connections 54.1, 56.1. As a result of these unpredictable rotations about the axis of pivoting AP, the second shackle 46 may come into contact with one of the first and second flanges 62.1, 62.2 of the engine clevis block 62 and/or with one of the first and second flanges 64.1, 64.2 of the beam clevis block 64, as illustrated in FIG. 5. These contacts may cause damage to the second shackle 46, to the engine clevis block 62 and/or to the beam clevis block 64.

As a result, when the aircraft is being operated, it is necessary to regularly inspect the second shackle 46 and the clevis blocks 62, 64 to which it is connected in order to ensure that these have not become damaged.

SUMMARY OF THE INVENTION

The present invention aims to remedy all or some of the drawbacks of the prior art.

To this end, one subject of the invention is an aircraft engine attachment system configured to connect a primary motive-power unit and a primary structure of a pylon of the aircraft, said engine attachment system comprising:

at least a two-point first shackle which comprises a body and first and second orifices opening onto first and second faces of the body, at least a first clevis block, secured to a first of the elements that are the primary structure and the motive-power unit and which has first and second flanges, a first connection pin passing through the first orifice and connecting the first shackle and the first clevis block, a second connection pin passing through the second orifice and configured to connect the first shackle and a second, different than the first, of the elements that are the primary structure and the motive-power unit, a first ball-joint connection positioned in the first orifice and interposed between the body and the first connection pin, a second ball-joint connection positioned in the second orifice and interposed between the body and the first connection pin.

According to the invention, the two-point first shackle comprises:

at least one extension at least partially positioned between the first and second flanges of the first clevis block, said extension comprising first and second faces that are substantially mutually parallel and oriented respectively toward the first and second flanges of the first clevis block, the body and the extension forming just one single component, at least a first stop connected to the extension and positioned projecting with respect to the first face of the extension and facing the first flange of the first clevis block, and/or at least a second stop connected to the extension and positioned projecting with respect to the second face of the extension and facing the second flange of the first clevis block.

This solution makes it possible to avoid the risk of damage to the body of the first shackle when the latter pivots as a result, for example, of expansion phenomena.

According to another feature, the two-point first shackle comprises first and second stops respectively comprising first and second contact faces that are substantially mutually parallel and separated by a distance that is smaller than the distance separating the first and second flanges of the first clevis block.

According to another feature, each of the first and second stops is connected to the extension by a releasable connection.

According to another feature, the extension comprises a through-hole. To complement this, at least one of the first and second stops comprises a rod housed in the through-hole.

According to another feature, the first stop comprises a first head projecting relative to the first face of the extension and a first rod secured to the first head and housed in the through-hole, the second stop comprising a second head projecting relative to the second face of the extension and a second rod secured to the second head and housed in the through-hole, the first and second rods sliding one inside the other.

According to another feature, of the first and second rods an outer rod is tubular, and of the first and second heads an outer head, connected to the outer rod, is annular. To complement this, of the first and second rods an inner rod, different than the outer rod, has an outside diameter substantially equal to the inside diameters of the outer rod and head so as to be able to slide therein.

In a variant, the through-hole has an inside diameter substantially equal to the outside diameter of the outer rod.

In another variant, the two-point first shackle comprises a ball-joint connection interposed between the extension and the outer rod.

According to another feature, each of the first and second stops is made from material that is more malleable than that of the first clevis block.

According to another feature, the extension has a thickness less than that of the body of the first shackle.

According to another feature, the first and second faces of the extension are positioned in two planes situated between the first and second faces of the body and approximately centered with respect to the first and second faces of the body.

According to another feature, the engine attachment system comprises a transverse beam configured to be connected to the primary structure, the first clevis block being secured to said transverse beam, the first connection pin being a first beam connection pin connecting the transverse beam and the two-point first shackle, the second connection pin being a first engine connection pin configured to connect the two-point first shackle and the motive-power unit. To complement this, the engine attachment system comprises:

an L-shaped three-point second shackle, which has a first end, a second end and an intermediate zone, a second beam connection pin connecting the first end of the second shackle and the transverse beam, a third beam connection pin connecting the intermediate zone of the second shackle and the transverse beam, a second engine connection pin configured to connect the second shackle and the motive-power unit.

The invention also relates to an aircraft comprising at least one engine attachment system according to one of the above features.

BRIEF DESCRIPTION OF THE DRAWINGS

Other features and advantages will become apparent from the following description of the invention, the description being given solely by way of example, with reference to the appended drawings, in which.

DETAILED DESCRIPTION OF THE PREFERRED EMBODIMENTS

Figure 1:
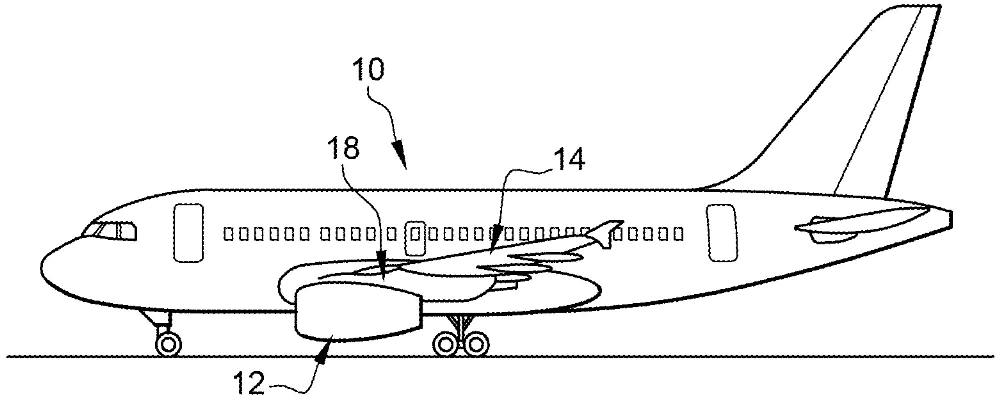
FIG. 1 is a side view of an aircraft.
Figure 2:
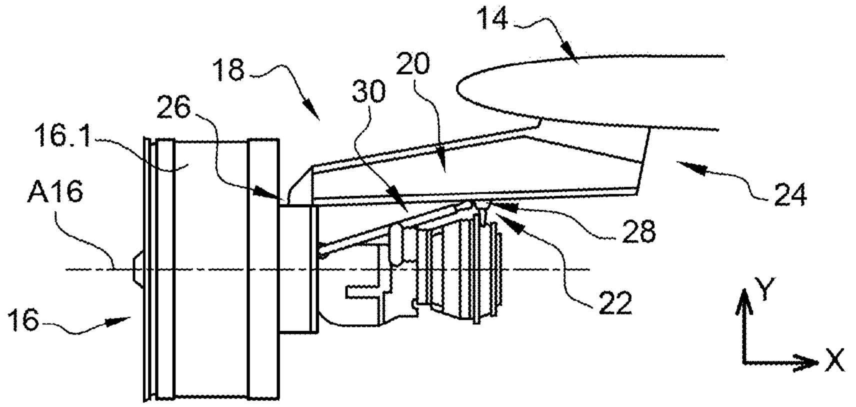
FIG. 2 is a side view of a motive-power unit, without its fairing.
Figure 3:
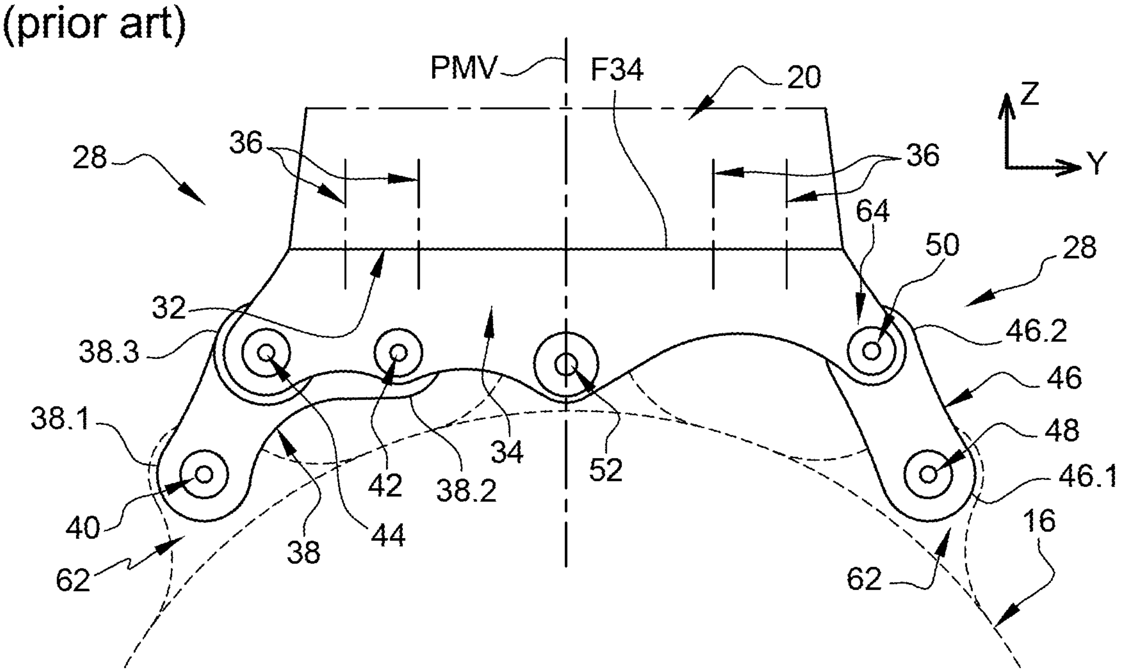
FIG. 3 is a front view of an engine attachment system, illustrating an embodiment of the prior art.
Figure 4:
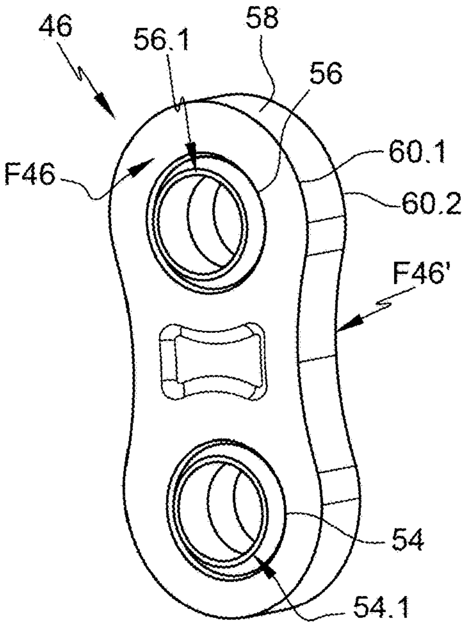
FIG. 4 is a perspective view of a two-point shackle, illustrating an embodiment of the prior art.
Figure 5:
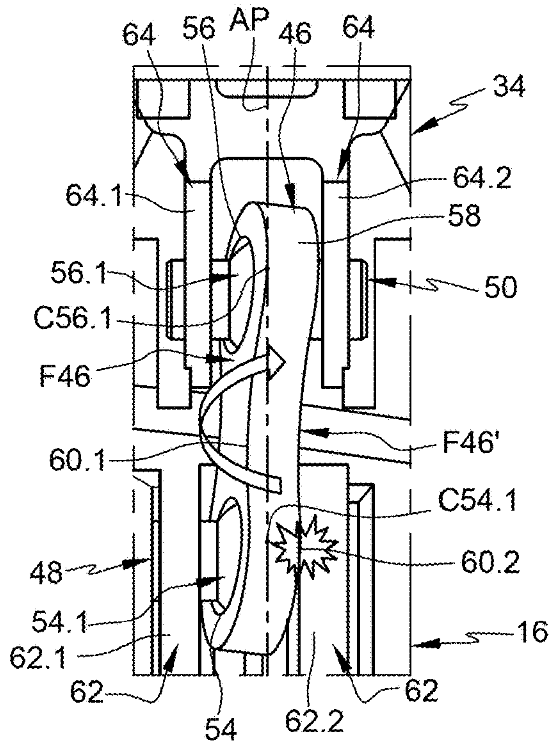
FIG. 5 is a side view of the engine attachment system visible in FIG. 3.
Figure 6:
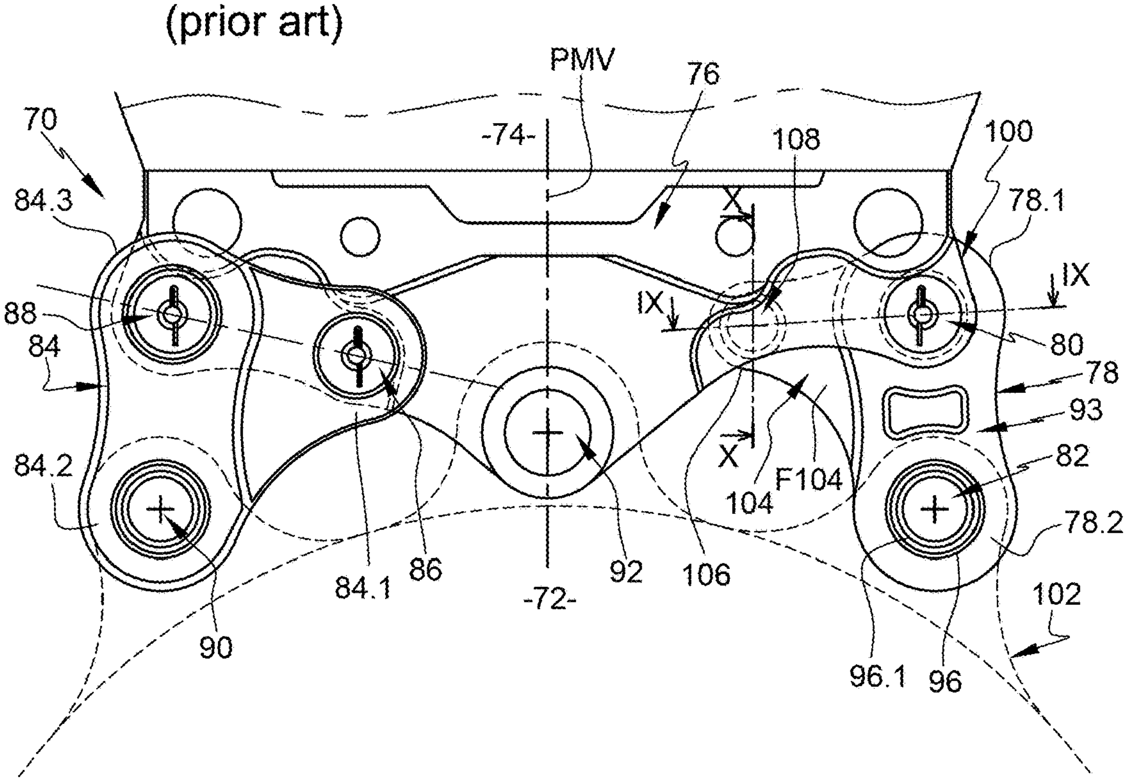
FIG. 6 is a front view of an engine attachment system, illustrating an embodiment of the invention.
Figure 7:
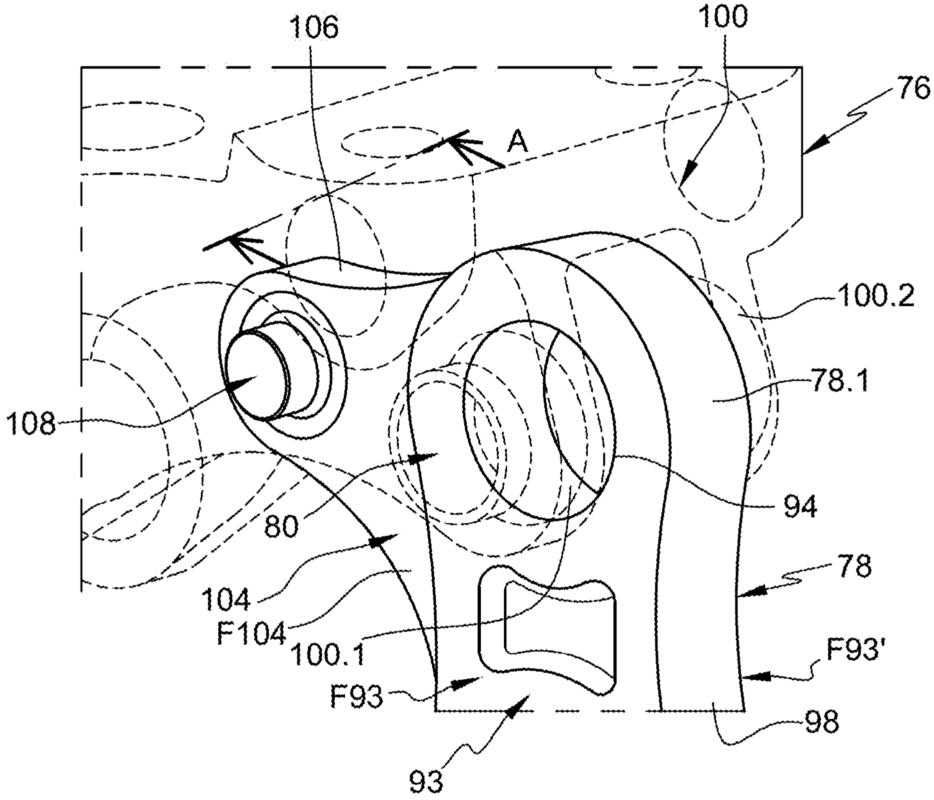
FIG. 7 is a perspective view of part of the engine attachment system visible in FIG. 6.
Figure 8:
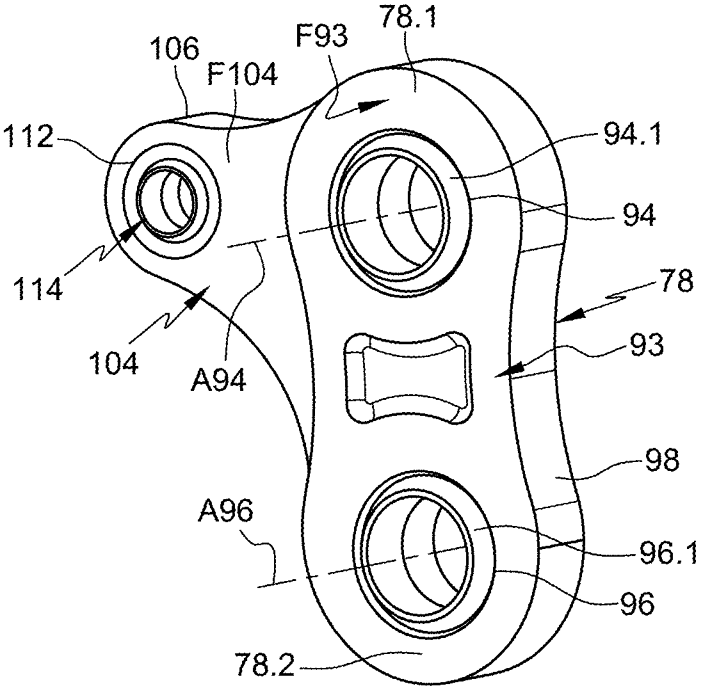
FIG. 8 is a perspective view of a two-point shackle, illustrating an embodiment of the invention.
Figure 9:
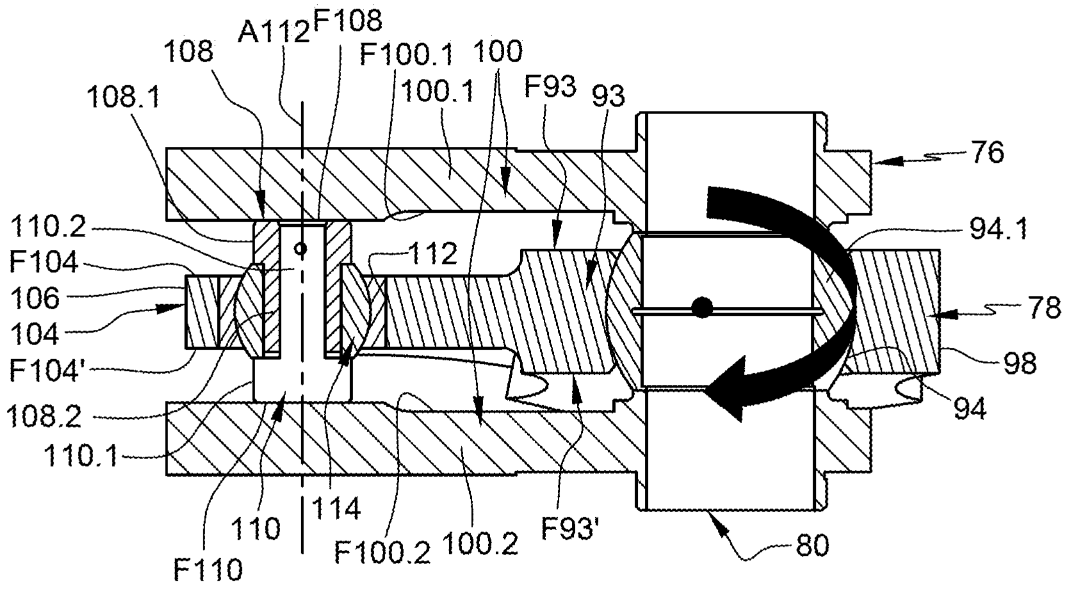
FIG. 9 is a view in section on IX-IX of the engine attachment system visible in FIG. 6.
Figure 10:
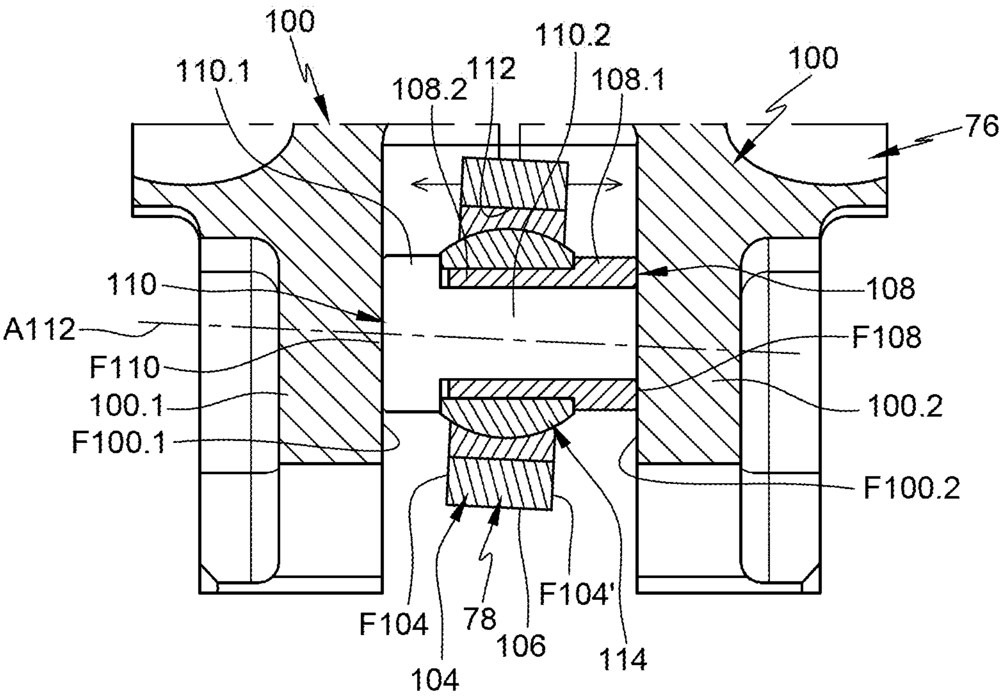
FIG. 10 is a view in section on X-X of the engine attachment system visible in FIG. 6.

According to an embodiment visible in FIG. 6, an aircraft engine attachment system 70 connects a motive-power unit 72 and a primary structure 74 of an aircraft.

According to one embodiment, the engine attachment system 70 comprises:

a transverse beam 76 configured to be connected to the primary structure 74, a two-point first shackle 78, which has first and second ends 78.1, 78.2, a first beam connection pin 80 connecting the first end 78.1 of the first shackle 78 and the transverse beam 76, a first engine connection pin 82 configured to connect the second end 78.2 of the first shackle 78 and the motive-power unit 72, an L-shaped three-point second shackle 84, which has a first end 84.1, a second end 84.2 and an intermediate zone 84.3, a second beam connection pin 86 connecting the first end 84.1 of the second shackle 84 and the transverse beam 76, a third beam connection pin 88 connecting the intermediate zone 84.3 of the second shackle 84 and the transverse beam 76, a second engine connection pin 90 configured to connect the second end 84.2 of the second shackle 84 and the motive-power unit 72, an emergency connection pin 92 configured to connect the transverse beam 76 and the motive-power unit 72 in the event of a failure, and positioned between the first and second shackles 78, 84 at a vertical median plane PMV.

The two-point first shackle 78 comprises a body 93 which extends between the first and second ends 78.1, 78.2, and comprises:

a first orifice 94 passing through the body 93 and configured to house the first beam connection pin 80, a second orifice 96 passing through the body 93 and configured to house the first engine connection pin 82, first and second faces F93, F93' that are substantially mutually parallel and perpendicular to the axes of the first and second orifices 94, 96 and onto which the first and second orifices 94, 96 open, an edge-face 98 connecting the first and second faces F93, F93' and substantially perpendicular to the latter faces.

The engine attachment system 70 comprises a first ball-joint connection 94.1 positioned in the first orifice 94 and interposed between the body 93 and the first connection pin 80, and a second ball-joint connection 96.1 positioned in the second orifice 96 and interposed between the body 93 and the first connection pin 82.

To support the first beam connection pin 80, the transverse beam 76 comprises a beam clevis block 100 which has first and second flanges 100.1 and 100.2 respectively comprising first and second internal faces F100.1, F100.2 oriented toward one another.

To support the first engine connection pin 82, the motive-power unit 72 comprises an engine clevis block 102.

Of course, the invention is not limited to this embodiment of the engine attachment system 70.

Whatever the embodiment, the engine attachment system 70 comprises:

at least a two-point first shackle 78 which has a body 93 and first and second orifices 94, 96 passing through the body 93, at least a first clevis block 100, secured to a first of the elements that are a primary structure 74 of a pylon and a motive-power unit 72 of an aircraft and which has first and second flanges 100.1 and 100.2 respectively comprising first and second internal faces F100.1, F100.2 oriented toward one another, a first connection pin 80 passing through the first orifice 94 and connecting the first shackle 78 and the first clevis block 100, a second connection pin 82 passing through the second orifice 96 and configured to connect the second end 78.2 of the first shackle 78 and a second, different than the first, of the elements that are the primary structure 74 and the motive-power unit 72.

The first and second internal faces F100.1, F100.2 respectively face the first and second faces F93, F93' of the body 93 of the two-point first shackle 78.

According to one particular feature of the invention, the two-point first shackle 78 comprises at least one extension 104, projecting from its edge-face 98, and at least partially positioned between the first and second flanges 100.1, 100.2 of the first clevis block 100. The body 93 and the extension 104 of the two-point first shackle 78 are produced as one piece and form just one single component.

This extension 104 has first and second faces F104, F104' that are planar, substantially mutually parallel, and oriented respectively toward the first and second flanges 100.1, 100.2 of the first clevis block 100, as well as a periphery 106 connecting the first and second faces F104, 104'. In one arrangement, the first and second faces F104, F104' of the extension 104 are parallel to the first and second faces F93, F93' of the body 93 of the first shackle 78.

In one configuration, the extension 104 has a thickness (distance separating the first and second faces F104, F104' of the extension 104) less than that of the body 93 of the first shackle 78. The first and second faces F104, F104' of the extension 104 are positioned in two planes situated between the first and second faces F93, F93' of the body 93 of the first shackle 78 and approximately centered with respect to the first and second faces F93, F93' of the body 93. In a variant, the extension 104 may have a thickness greater than or equal to that of the body 93.

In one arrangement, the two-point first shackle 78 has a first offset D1 (distance measured in a direction perpendicular to the faces F93, F93', F104, F104') between the first faces F93, F104 of the body 93 and of the extension 104 and/or a second offset D2 between the second faces F93', F104' of the body 93 and of the extension F104.

According to one feature of the invention, the two-point first shackle 78 comprises at least a first stop 108 connected to the extension 104 and positioned projecting with respect to the first face F104 of the extension 104 and facing the first flange 100.1 of the clevis block 100, and/or at least a second stop 110 connected to the extension 104 and positioned projecting with respect to the second face F104' of the extension 104 and facing the second flange 100.2 of the clevis block 100. Each of the first and second stops 108, 110 is dimensioned so that when said first or second stop 108, 110 is in contact with the clevis block 100, the rest of the shackle and notably the body 93 and extension 104 thereof are separated from the clevis block 100. This arrangement makes it possible to avoid the risks of damage to the body 93 and/or to the extension 104 of the shackle 78.

The first and second stops 108, 110 respectively comprise first and second contact faces F108, F110 that are substantially mutually parallel and parallel to the first and second faces F104, F104' of the extension 104, and configured to be in contact with the clevis block 100. The first and second contact faces F108, F110 are separated by a distance that is smaller than the distance separating the first and second flanges 100.1, 100.2 of the clevis block 100 so as to allow the two-point first shackle 78 to pivot with respect to the first and second connection pins 80, 82 notably as a result of phenomena of different expansions between the motive-power unit 72 and the primary structure 74. Thus, the first and second contact faces F108, F110 are never simultaneously in contact with the clevis block 100.

In one configuration, the first stop 108 has a height (distance separating the first contact face F108 and the first face F104 of the extension 104) greater than the first offset D1. The second stop 110 has a height (distance separating the second contact face F110 and the second face F104' of the extension 104) greater than the second offset D2.

According to one embodiment, each of the first and second stops 108, 110 is connected to the extension 104 by a releasable connection, so that it can be changed in the event of wear. Thus, only the first or second stop 108, 110 (rather than the first shackle 78 in its entirety) need be changed in the event of wear.

In one configuration, each of the first and second stops 108, 110 is made from a material that is more malleable than that of the clevis block 100. Thus, in the event of an impact between the first or second stop 108, 110 and the clevis block 100, only the first or second stop 108, 110 becomes marked. The clevis block 100 suffers no damage.

According to one embodiment, the extension 104 comprises a through-hole 112 that opens onto the first and second faces F104, F104' of the extension 104 and has an axis A112 substantially perpendicular to the first and second faces F104, F104' of the extension 104.

In one arrangement, the straight line that passes through the axes A112, A94 of the through-hole 112 of the extension 104 and of the first orifice 94 of the body 93 and the one that passes through the axes A94, A96 of the first and second orifices 94, 96 of the body 93 make an angle comprised between 75 and 90°. The axes A112, A94 of the through-hole 112 and of the first orifice 94 are separated by a distance that is comprised between half and one times the distance separating the axes A94, A96 of the first and second orifices 94, 96 of the body 93.

The first stop 108 comprises a first head 108.1 projecting relative to the first face F104 of the extension 104 and a first rod 108.2 secured to the first head 108.1 and housed in the through-hole 112. The second stop 110 comprises a second head 110.1 projecting relative to the second face F104' of the extension 104 and a second rod 110.2 secured to the second head 110.2 and housed in the through-hole 112, the first and second rods 108.2, 110.2 sliding one inside the other.

In a simplified variant, at least one of the first and second stops 108, 110 comprises a rod 108.2, 110.2 housed in the through-hole 112.

According to one embodiment, the second rod 110.2 is cylindrical and has a given outside diameter. The second head 110.1 is cylindrical and substantially coaxial with the second rod 110.2 and has a greater diameter than that of the outside diameter of the second rod 110.2.

To complement that, the first rod 108.2 is tubular and has an inside diameter substantially equal to the outside diameter of the second rod 110.2 so as to allow the latter to slide in the first rod 108.2. The first head 108.1 is annular and has an inside diameter substantially equal to the inside diameter of the tubular first rod 108.2 and an outside diameter greater than the outside diameter of the first rod 108.2. According to this embodiment, the second rod 110.2 of the second stop 110 slides in the tubular first rod 108.2 and the annular first head 108.1 of the first stop 108.

As a variant, the first rod 108.2 of the first stop 108 is solid and configured to slide in the second head 110.1 and the second rod 110.2 of the second stop 110, which are hollow.

Thus, of the first and second rods 108.2, 110.2 an outer rod is tubular and has both an inside and an outside diameter. Of the first and second heads 108.1, 110.1 an outer head connected to the outer rod is annular and has an inside diameter substantially equal to the inside diameter of the outer rod. To complement this, of the first and second rods 108.2, 110.2 an inner rod (different than the outer rod) has an outside diameter substantially equal to the inside diameters of the outer rod and head so as to be able to slide therein.

According to one embodiment, the through-hole 112 has an inside diameter substantially equal to the outside diameter of the outer rod 108.2, 110.2. According to this embodiment, the tubular outer rod may slide in the through-hole 112, and the inner rod may slide in the outer rod.

According to another embodiment, the two-point first shackle 78 comprises a ball-joint connection 114 interposed between the stop 108 and the outer rod. The ball-joint connection 114 has an outside diameter substantially equal to the inside diameter of the through-tube 112, and an inside diameter substantially equal to the outside diameter of the outer rod.

Providing a ball-joint connection 114 allows the first and second stops 108, 110 to have an orientation that can adapt to suit the orientation of the two-point second shackle 78 with respect to the clevis block 100. Thus, the first and second stops 108, 110 are able to pivot with respect to the extension 104 so that when the first or second contact face F108, F110 is in contact with the internal face F100.1, F100.2 of the first or second flange 100.1, 100.2 of the clevis block 100, it is substantially parallel to said internal face F100.1, F100.2.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. An engine attachment system configured to connect a motive-power unit and a primary structure of a pylon of an aircraft, said engine attachment system comprising:

at least a two-point first shackle which comprises a body and a first orifice and a second orifice opening onto first and second faces of the body;

at least a first clevis block, secured to a first element of the primary structure and the motive-power unit and which has first and second flanges;

a first connection pin passing through the first orifice and connecting the first shackle and the at least one first clevis block;

a second connection pin passing through the second orifice and configured to connect the first shackle and a second element, different than the first element, of the primary structure and the motive-power unit;

a first ball-joint connection positioned in the first orifice and interposed between the body and the first connection pin; and, a second ball-joint connection positioned in the second orifice and interposed between the body and the first connection pin, wherein the two-point first shackle comprises:

at least one extension at least partially positioned between the first and second flanges of the at least one first clevis block, said at least one extension comprising first and second faces that are substantially mutually parallel and oriented respectively toward the first and second flanges of the at least one first clevis block, the body and the at least one extension forming just one single component, wherein the extension has a thickness less than that of the body of the first shackle; and at least a first stop connected to the extension and positioned projecting with respect to the first face of the extension and facing the first flange of the at least one first clevis block, or at least a second stop connected to the extension and positioned projecting with respect to the second face of the extension and facing the second flange of the at least one first clevis block, or both.

2. The engine attachment system as claimed in claim 1, wherein the two-point first shackle comprises first and second stops respectively comprising first and second contact faces that are substantially mutually parallel and separated by a distance that is smaller than a distance separating the first and second flanges of the at least one first clevis block.

3. The engine attachment system as claimed in claim 2, wherein the extension comprises a through-hole and wherein at least one of the first and second stops comprises a rod housed in the through-hole.

4. The engine attachment system as claimed in claim 3, wherein the first stop comprises a first head projecting relative to the first face of the extension and a first rod secured to the first head and housed in the through-hole, and wherein the second stop comprises a second head projecting relative to the second face of the extension and a second rod secured to the second head and housed in the through-hole, the first and second rods sliding one inside the other.

5. The engine attachment system as claimed in claim 4, wherein of the first and second rods, an outer rod is tubular, wherein of the first and second heads an outer head, connected to the outer rod, is annular, and wherein of the first and second rods an inner rod, different than the outer rod, has an outside diameter substantially equal to inside diameters of the outer rod and outer head so as to be able to slide therein.

6. The engine attachment system as claimed in claim 5, wherein the through-hole has an inside diameter substantially equal to an outside diameter of the outer rod.

7. The engine attachment system as claimed in claim 5, wherein the two-point first shackle comprises a ball-joint connection interposed between the extension and the outer rod.

8. The engine attachment system as claimed in claim 1, wherein each of the first and second stops is made from material that is more malleable than that of the at least one first clevis block.

9. The engine attachment systems as claimed in claim 1, wherein the first and second faces of the extension are positioned in two planes situated between the first and second faces of the body and approximately centered with respect to the first and second faces of the body.

10. The engine attachment system as claimed in claim 1, wherein the engine attachment system comprises a transverse beam configured to be connected to the primary structure, the at least one first clevis block being secured to said transverse beam, the first connection pin being a first beam connection pin connecting the transverse beam and the two-point first shackle, the second connection pin being a first engine connection pin configured to connect the two-point first shackle and the motive-power unit, and wherein the engine attachment system comprises:

an L-shaped three-point second shackle, which has a first end, a second end, and an intermediate zone, a second beam connection pin connecting the first end of the second shackle and the transverse beam, a third beam connection pin connecting the intermediate zone of the second shackle and the transverse beam, a second engine connection pin configured to connect the second shackle and the motive-power unit.

11. An aircraft comprising:

at least one engine attachment system as claimed in claim 1.

12. An engine attachment system configured to connect a motive-power unit and a primary structure of a pylon of an aircraft, said engine attachment system comprising:

at least a two-point first shackle which comprises a body and a first orifice and a second orifice opening onto first and second faces of the body;

at least a first clevis block, secured to a first element of the primary structure and the motive-power unit and which has first and second flanges;

a first connection pin passing through the first orifice and connecting the first shackle and the at least one first clevis block;

a second connection pin passing through the second orifice and configured to connect the first shackle and a second element, different than the first element, of the primary structure and the motive-power unit;

a first ball-joint connection positioned in the first orifice and interposed between the body and the first connection pin; and, a second ball-joint connection positioned in the second orifice and interposed between the body and the first connection pin, wherein the two-point first shackle comprises:

at least one extension at least partially positioned between the first and second flanges of the at least one first clevis block, said at least one extension comprising first and second faces that are substantially mutually parallel and oriented respectively toward the first and second flanges of the at least one first clevis block, the body and the at least one extension forming just one single component, wherein the extension has a thickness less than that of the body of the first shackle; and at least a first stop connected to the extension and positioned projecting with respect to the first face of the extension and facing the first flange of the at least one first clevis block, or at least a second stop connected to the extension and positioned projecting with respect to the second face of the extension and facing the second flange of the at least one first clevis block, or both, and, wherein the first and second faces of the extension are positioned in two planes situated between the first and second faces of the body and approximately centered with respect to the first and second faces of the body.

* * * * *